US009237310B2

(12) United States Patent
Onno et al.

(10) Patent No.: US 9,237,310 B2
(45) Date of Patent: Jan. 12, 2016

(54) METHOD AND SYSTEM DIGITAL FOR PROCESSING DIGITAL CONTENT ACCORDING TO A WORKFLOW

(75) Inventors: Stéphane Onno, Saint-Gregoire (FR); Eric Diehl, Liffre (FR); Alain Durand, Rennes (FR)

(73) Assignee: Thomson Licensing (FR)

( * ) Notice: Subject to any disclaimer, the term of this patent is extended or adjusted under 35 U.S.C. 154(b) by 688 days.

(21) Appl. No.: 12/590,912

(22) Filed: Nov. 16, 2009

(65) Prior Publication Data

US 2010/0146297 A1  Jun. 10, 2010

(30) Foreign Application Priority Data

Nov. 26, 2008 (EP) .................................. 08305840

(51) Int. Cl.
*G06F 7/00* (2006.01)
*H04N 7/16* (2011.01)
*H04N 21/4627* (2011.01)
*H04N 21/6334* (2011.01)

(52) U.S. Cl.
CPC ........... *H04N 7/165* (2013.01); *H04N 21/4627* (2013.01); *H04N 21/63345* (2013.01)

(58) Field of Classification Search
USPC ......................................... 713/189; 707/705
See application file for complete search history.

(56) References Cited

U.S. PATENT DOCUMENTS

| 5,668,877 | A | 9/1997 | Aziz | |
|---|---|---|---|---|
| 7,634,800 | B2 * | 12/2009 | Ide | G06F 21/31 709/217 |
| 2003/0217264 | A1 * | 11/2003 | Martin | G06F 21/6209 713/156 |
| 2004/0039741 | A1 * | 2/2004 | Benson | G06F 21/10 1/1 |
| 2004/0102987 | A1 * | 5/2004 | Takahashi | G06F 21/10 705/59 |
| 2004/0179685 | A1 | 9/2004 | Soliman | |
| 2006/0044610 | A1 | 3/2006 | Miyata | |
| 2006/0053232 | A1 * | 3/2006 | Onoda | G06F 21/10 709/246 |

(Continued)

FOREIGN PATENT DOCUMENTS

| CN | 101072096 | 11/2007 |
|---|---|---|
| EP | 0687087 | 12/1995 |

(Continued)

OTHER PUBLICATIONS

Wang, YK. et al., "A Proposal on Video Editing System Coping with Rights Inheritance Management for Secondary Content", Sec. International Conf. on Electrical Engineering, Piscataway, NJ, USA, Mar. 25, 2008, pp. 1-2.

(Continued)

*Primary Examiner* — Joseph P Hirl
*Assistant Examiner* — Sayed Beheshti Shirazi
(74) *Attorney, Agent, or Firm* — Jack Schwartz & Associates, PLLC

(57) ABSTRACT

A method of processing digital content according to a workflow. The digital content is received and information for the workflow is checked to decide if a processing device is authorized to process the content, the workflow imposing that the digital content be processed in a process chain comprising at least two nodes, wherein the processing device is authorized to process the content if it corresponds to the node that according to the process chain is the next node to process the digital content. If the processing device is authorized to process the content, the digital content is processed and the information for the workflow is updated. Also provided is a system.

5 Claims, 6 Drawing Sheets

(56) References Cited

U.S. PATENT DOCUMENTS

| | | | |
|---|---|---|---|
| 2007/0011097 A1* | 1/2007 | Eckleder | G06F 21/10 705/59 |
| 2008/0016001 A1* | 1/2008 | Nakano | G06F 21/10 705/58 |
| 2008/0075290 A1 | 3/2008 | Nishiguchi et al. | |
| 2008/0120367 A1* | 5/2008 | Thibault | G05B 19/41835 709/203 |
| 2008/0298201 A1* | 12/2008 | Kakimoto | G11B 3/64 369/84 |
| 2008/0305738 A1* | 12/2008 | Khedouri | G06F 17/30038 455/3.06 |
| 2008/0313634 A1 | 12/2008 | Matsueda | |
| 2009/0098894 A1* | 4/2009 | Dudley | H04L 12/5835 455/466 |
| 2009/0201916 A1* | 8/2009 | Caron | H04L 12/66 370/352 |
| 2009/0210724 A1 | 8/2009 | Hori | |
| 2010/0131584 A1* | 5/2010 | Johnson | H04W 4/025 709/203 |

FOREIGN PATENT DOCUMENTS

| | | |
|---|---|---|
| EP | 1975831 | 1/2008 |
| JP | 2004048127 | 2/2004 |
| JP | 2006072521 | 3/2006 |
| JP | 2007158559 | 6/2007 |
| JP | 2008276704 | 11/2008 |
| WO | WO03/084166 | 10/2003 |
| WO | WO2004/002057 | 12/2003 |
| WO | WO2006/032942 | 3/2006 |
| WO | WO2006/083141 | 8/2006 |
| WO | WO2007/129434 | 11/2007 |
| WO | WO/2008/116779 | 10/2008 |

OTHER PUBLICATIONS

David Hollingsworth, Workflow Management Coalition The Workflow Reference Model, Document No. TC00-1003, Issue 1.1, Jan. 19, 1995, pp. 1-55.

Nick Russell et al., "Workflow Control-Flow Patterns a Revised View", Patterns for Process-Aware Information Systems (P4PAIS), pp. 1-134.

Workflow Management Caolition Terminolgy & Glossary, Document No. WFMC-TC-1001, Issue 3.0, Feb. 1999, pp. 1-65.

David Austerberry, "Digital Asset Management How to Realise the Value of Video and Image Libraries", Chaper 17, pp. 289-311, ISBN-13: 978-0240519241 ISBN-10: 0240519248 Edition 1, Feb. 19, 2004.

* cited by examiner

METHOD AND SYSTEM DIGITAL FOR PROCESSING DIGITAL CONTENT ACCORDING TO A WORKFLOW

This application claims the benefit, under 35 U.S.C. §119, of European Patent Application No. 08305840.4 of 26 Nov. 2008.

FIELD OF THE INVENTION

The present invention relates generally to digital content processing, and in particular to workflows for digital content.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Content, such as multimedia content—e.g. films and music—documents, photos and so on often need to be processed before it is released for the enjoyment of the end user.

Films, for example, pass many processing steps from the actual recording to the release: de-rushing, mixing, addition of digital effects, dubbing, subtitling, and so on.

It will be readily appreciated that a content provider has two requirements for a processing (also called post-processing) system: 1) strict and traceable processing operations, and 2) easy transmission and duplication of the content. The person skilled in the art will appreciate that prior art systems satisfy one or the other requirement, but not both.

Analogue systems generally satisfy the first requirement. As content is stored on tapes or film reels, it is relatively easy to control the processing: a particular content remains with a certain department until the tape is sent to the next department. In addition, it is also possible to trace the tape in case of theft. On the other hand, transmission of the content is less straight-forward, as this requires sending the physical tape, which naturally is difficult, particularly if long distances are involved. It is also difficult to provide the content to more than one entity at once, as the content has to be physically duplicated. In addition, erasing and/or destroying content after use may also provide constraints on the users.

Digital systems provide easy transmission and duplication of content. However, it is much more difficult to control the processing of the content: if the content resides on a server, it is very difficult to control who has access to it and errors may often be made if one department erroneously believes that the previous department has finished processing the content.

FIG. 1 shows an exemplary processing system in which the invention may be used. The system 100 comprises a subtitling device 110, a colour management device 120, a dubbing device 140, a digital special effects device 150, a storage device 160, and an emission clearance device 130, all connected by a network 170.

In the system of FIG. 1, it may for example be required that content pass colour management 120 and digital effects 150 (in no particular order) before being sent to dubbing 140 and optionally further to subtitling 110, before passing through emission clearance 130. As every device has access to the storage 160, it is difficult to control that the workflow is respected.

This difficulty in digital systems is inherent in Digital Rights Management (DRM) Systems. DRM controls access to the content according to usage restrictions. The content is encrypted and a separate license is provided to the end user.

A DRM architecture comprises a content provider, a content distributor, a license issuer, and content users, and has the following characteristics: 1) they are built around the servers, 2) an end user is not allowed to create new content and licenses from the obtained content, and 3) the right to decrypt the content is global—the user either has it or he doesn't.

It will thus be appreciated that most prior art DRM solutions are not appropriate to fulfil the two requirements listed hereinbefore.

International application PCT/EP08/053181 presents a solution in which a workflow for digital content is ensured by having each processing device store a number of rules linking decryption keys and encryption keys. Imagine that digital content is supposed to be treated by a colour management device, a dubbing device and a subtitling device, in that order. The content is ingested into the system by encrypting it using an encryption key for which only the colour management device has the corresponding decryption key. The colour management device stores a rule stating that content decrypted using the decryption key should be encrypted using an encryption key for which only the dubbing device possesses the corresponding decryption key. The same scheme is applied to the other devices. As such, the workflow is ensured.

While this solution works well in many cases, it can in some instances be difficult to manage the keys in the system, especially when the content is to be treated by external devices.

It can thus be appreciated that there is a need for an alternative solution that enables a processing system in which digital content may be easily distributed and duplicated, while it also imposes strict processing operations, this solution being called Digital Processing Management (DPM).

The present invention provides such a solution, with a number of variants.

SUMMARY OF THE INVENTION

In a first aspect, the invention is directed to a method of processing digital content according to a workflow. Digital content is received, and workflow information is checked to decide if a processing device is authorised to process the content. If the processing device is authorised to process the content, then the digital content is processed and the workflow information is updated.

In a first preferred embodiment, the digital content is received in an encrypted form. Prior to the processing of the content, a decryption key for the encrypted digital content is provided and the encrypted digital content is decrypted. Subsequent to the processing of the content, the processed digital content is encrypted.

In a second preferred embodiment, the processing device comprises an identifier for the processing device. The digital content is received by the processing device that further sends a content identifier and the identifier for the processing device to a second device. The checking is performed by the second device by obtaining information for the workflow for the digital content corresponding to the content identifier and comparing it with the content identifier and the identifier for the processing device. The processing device processes the content and the second device updates the workflow information.

In a third preferred embodiment, the method comprises a preceding step of requesting by the processing device from a second device processing of the digital content. The digital content is received by the second device that also performs the checking by obtaining information for the workflow for the digital content and comparing it with an identifier for the processing device. The second device sends a processing plug-in to the processing device that runs the processing plug-in and receives the digital content that it processes. The updating is performed by the second device.

In a fourth preferred embodiment, a processing device receives the digital content and sends a content identifier for the digital content and an identifier for a device that most recently processed the digital content to a second device. Using the content identifier and the identifier for a device that most recently processed the digital content, the at least one action that may be applied to the content by at least one processing device is determined and the second device generates auxiliary information comprising this information. The checking is performed by comparing an identifier for the processing device and the auxiliary information, and the processing and updating are performed by the processing device.

In a second aspect, the invention is directed to a system for processing digital content according to a workflow. The system comprises a receiver adapted to receive digital content, a processing device adapted to process the digital content, a unit adapted to check information for the workflow to decide if the processing device is authorised to process the content, and a unit adapted to update the information for the workflow.

In a first preferred embodiment, the receiver is adapted to receive the digital content in an encrypted form. The system further comprises a first unit adapted to provide a decryption key for the encrypted digital content, a second unit adapted to decrypt the encrypted digital content, and a third unit adapted to encrypt the processed digital content.

BRIEF DESCRIPTION OF THE DRAWINGS

Preferred features of the present invention will now be described, by way of non-limiting example, with reference to the accompanying drawings, in which.

In the Figures, the represented blocks are purely functional entities, which do not necessarily correspond to physically separate entities. These functional entities may be implemented as hardware, software, or a combination of software and hardware; furthermore, they may be implemented in one or more integrated circuits.

PREFERRED EMBODIMENT OF THE INVENTION

A main idea of the invention is a method of processing digital content according to a workflow, the method comprising the steps of:

a) receiving the digital content at a first device b) requesting processing permission relative to the digital content from a second device c) generating in the second device the information relative to the content d) checking information for the workflow to decide if a processing device is authorised to process the content; and if the processing device is authorised to process the content:

e) processing the digital content at the first device; and f) updating the information for the workflow in the second device.

Generation of the processing information is always performed by a central device (the second device) based on contextual information. Contextual information can be for instance the current position in a process graph describing all possible processing steps the content can go through.

It will be appreciated the graph is only an exemplary way of controlling a workflow. The workflow may also be controlled taking into account the work load of devices and/or operators, so that only one or more devices with a lower work load may process the content at a given time. The workflow may also be controlled depending on the current time, in order for the content to be processed by operators located in the U.S. during their workday and not European operators whose workday may be over already. It is also possible to control the workflow depending on the persons in the vicinity of the potential processing device.

Key management and distribution—which is outside the scope of the present invention—may be handled using any suitable prior art method, for example described by Menezes et al. in Chapters 12 and 13 of Handbook of Applied Cryptography, Fifth printing (August 2001), CRC Press, ISBN: 0-8493-8523-7.

First Preferred Embodiment

Figure 1:
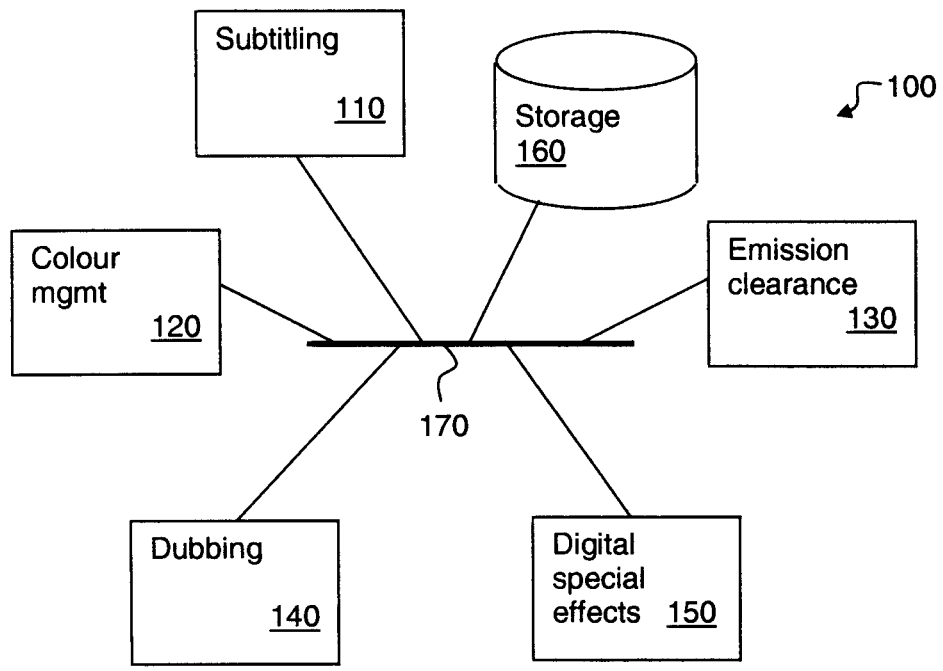
FIG. 1, already discussed, exemplary processing system in which the invention may be used.
Figure 2:
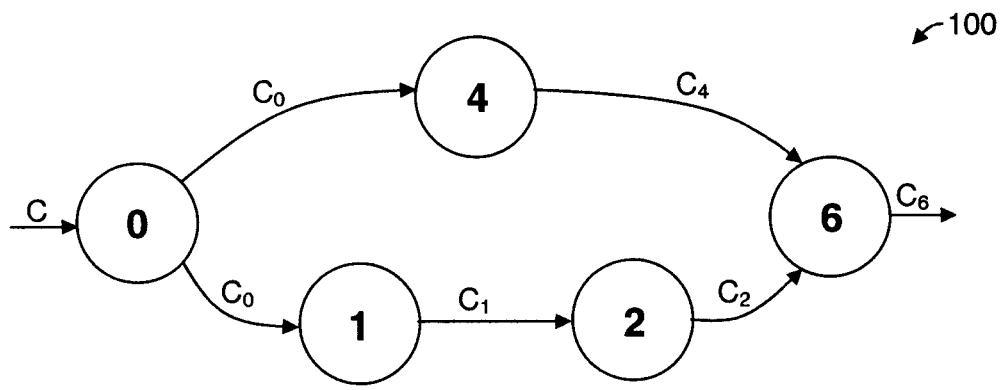
FIG. 2 illustrates a process graph for use with the present invention.
Figure 3:
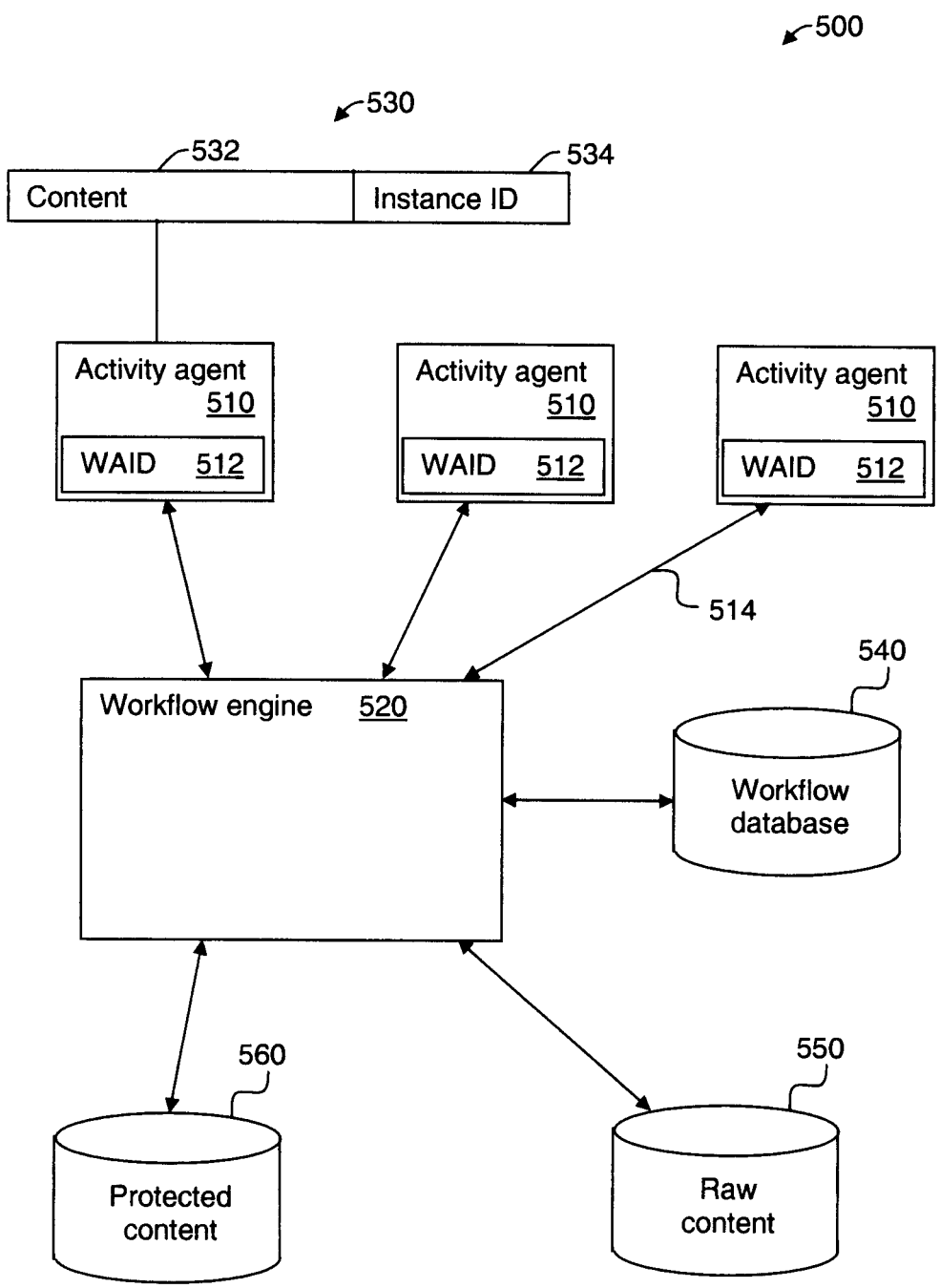
FIG. 3 illustrates a system for digital content processing according to a first preferred embodiment of the invention.

FIG. 3 illustrates a system for digital content processing according to the first preferred embodiment of the present invention. A system 500 for enforcing a workflow for a digital content comprises at least one workflow activity agent 510 adapted to modify digital content 532, a workflow engine 520, a workflow database 540, a raw content database 550 and a protected content database 560. Each workflow activity agent 510 stores a unique workflow agent identifier (WAID) 512, preferably in a secured location.

The digital content 532 is encrypted (except when stored in the raw content database) when it is not being processed by a workflow activity agent 510. Digital content 532 that is not being processed is stored in a content file 530, preferably together with an identifier 534 that provides information about the WAID 512 of the workflow activity agent 510 that most recently processed the digital content 532, and a header (not shown) with a content identifier of the digital content.

The workflow engine 520 prepares raw content, stored in the raw content database 550 or received in any other suitable manner, and prepares it by encrypting the raw digital content with a scrambling key to generate protected digital content and deciding which workflow to use for the digital content. The protected digital content is stored in the protected content database 560 and an entry for the digital content is stored in the workflow database 540, the entry comprising an identifier for the digital content, the scrambling key used to protect the digital content, the workflow to use for the content, and a position indicator. It will however be appreciated that it is also possible to modify the process graph each time it has been processed in order to remove nodes that have already been passed. The workflow database 540 (and/or the workflow engine) may also store information about the correspondence between a WAID 512 and the one or more nodes that the workflow activity agent 510 may act as.

When a user wishes to process a digital content, it extracts the content identifier from the content file 530 and sends the content identifier together with its WAID 512 to the workflow engine 520. The communication between the workflow activity agent 510 and the workflow engine 520 preferably passes over a secure authenticated channel (SAC) 514. The workflow engine 520 retrieves from the workflow database 540 the entry corresponding to the content identifier. Then it checks whether the workflow activity agent 510 with the present WAID 512 corresponds to one of the possibly plurality of nodes that follow the most recent node (i.e. the one referred to by the instance ID 534). If it turns out that the requesting workflow activity agent 510 is allowed to process the digital content 532, then the workflow engine 520 sends the content key (or keys) necessary for decryption to the workflow activity agent 510, possibly together with a second content key to be used for protection of the processed digital content.

When a workflow activity agent 510 has finished processing a digital content 532, it re-encrypts the digital content 532 and informs the workflow engine 520 that may then update the entry for the digital content 532 in the workflow database 540. It is preferred that the workflow activity agent 510 also sends the content file 530 for storage in the protected content database 560.

Figure 4:
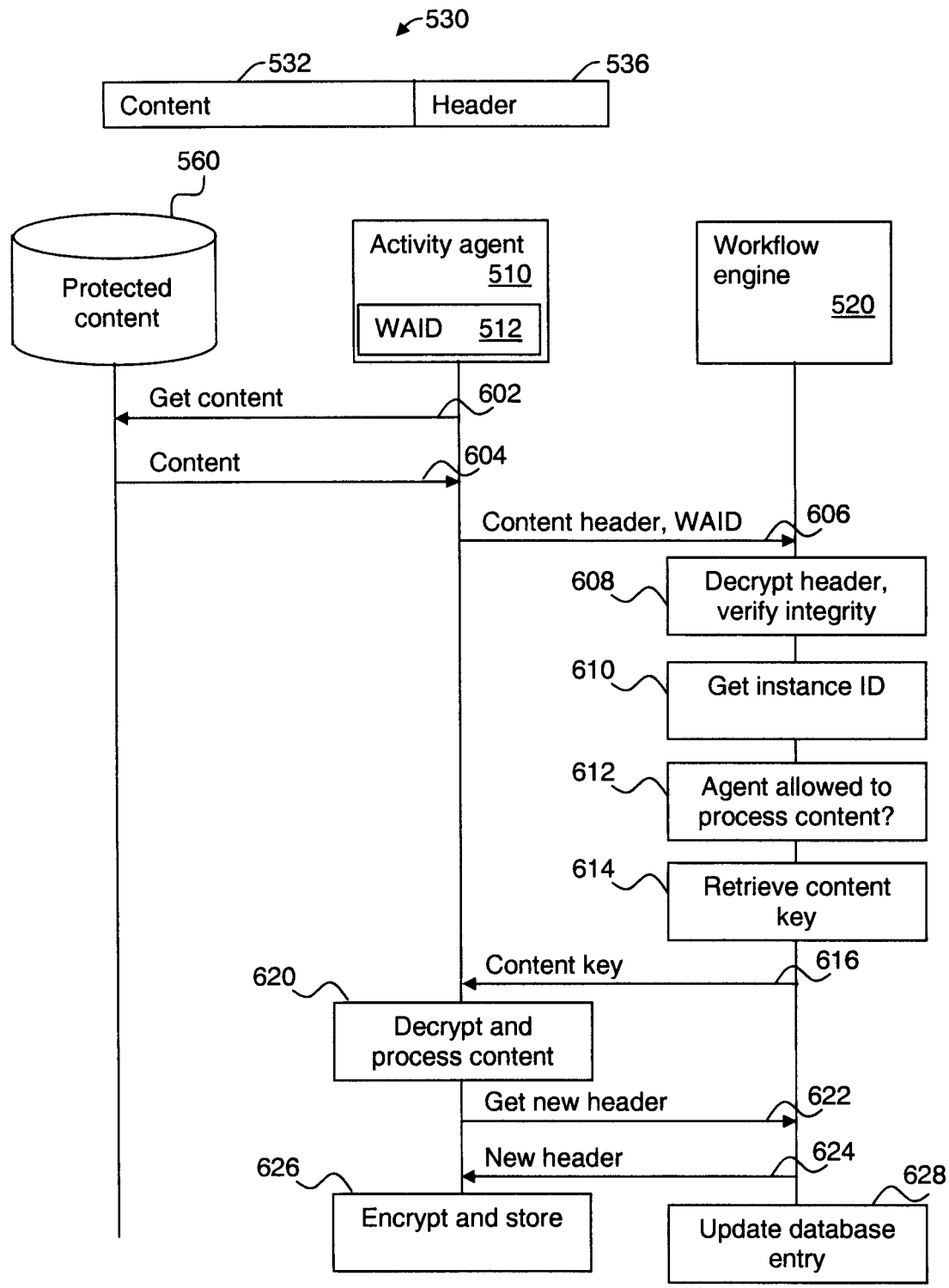
FIG. 4 illustrates an exemplary flow chart for a method for digital content processing according to the first preferred embodiment of the invention.

FIG. 4 illustrates an exemplary flow chart for a method for digital content processing according to the first preferred embodiment of the present invention.

In step 602, a user searches for digital content 532 using the header 536 of the content file 530. The header 536 preferably comprises a workflow ID that identifies the workflow used for the content, a field enabling verification of the integrity of the digital content 532, an identifier for the digital content, a field enabling verification of the integrity of the header, and metadata that comprises the instance ID 534 of the most recent node. It is preferred that the header, except for the metadata, is encrypted. The activity agent 510 then requests a content file 530 from the protected content database 560 that provides the content file 530 in step 604.

The activity agent 510 extracts the header 536 that it sends with its WAID 512 to the workflow engine 520 in step 606. The workflow engine 520 decrypts the received header and verifies its integrity, using the field enabling this; step 608. The workflow engine 520 then retrieves 610 the instance ID 534 and verifies 612 that the activity agent 510 is allowed to process the digital content 532. If this is not the case, the workflow engine 520 preferably informs the activity agent 510 of this and aborts. However, if the activity engine 510 is allowed to process the digital content 532, then the workflow engine 520 retrieves 614 the content key from the workflow database 540 and sends 616 the content key to the activity agent 510.

The workflow activity agent 510 then decrypts and processes the digital content 532; step 620. It then requests 622 a new header from the workflow engine 520 that generates a new header that it returns 624 to the activity agent 510, which then encrypts the digital content 532 and stores the corresponding content file, step 626.

The activity engine 520 then updates 628 the entry for the digital content in the workflow database 540. It does this by storing the content key used to protect the processed content and, possibly, by updating the position indicator if it is used or by modifying the process graph.

Variant of the First Preferred Embodiment

In a variant of the first preferred embodiment, a processing device does not initially store any workflow agent identifier, and it is also possible that it does not store all the necessary software to access the digital content. To be able to process the digital content, the device request, receives and installs a workflow agent plug-in.

Figure 5:
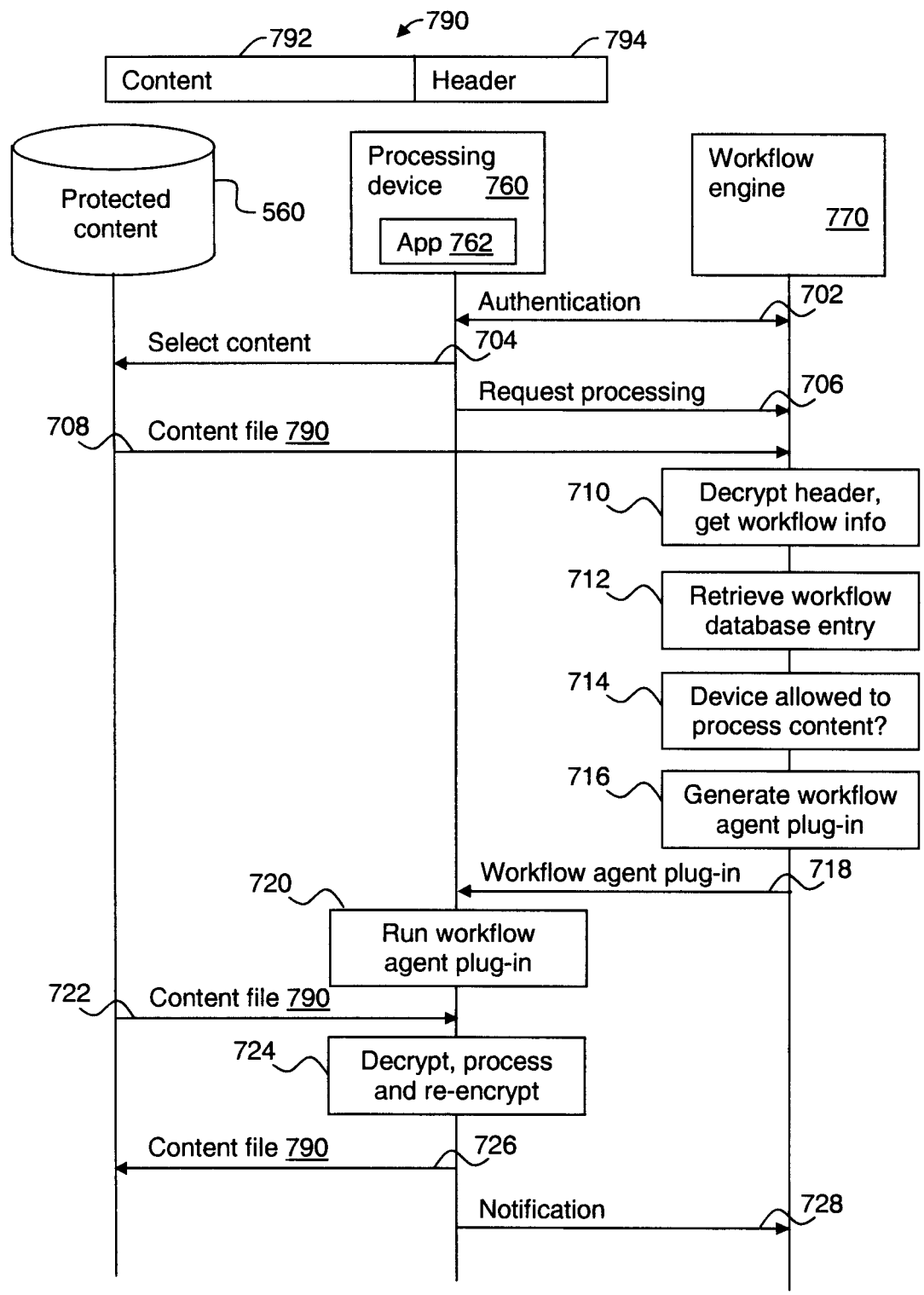
FIG. 5 illustrates an exemplary flow chart for a method for digital content processing according to a variant of the first preferred embodiment of the invention.

FIG. 5 illustrates a flowchart of the variant of the first preferred embodiment of the present invention. At first, a workflow engine 770 authenticates 702 at least one, preferably all, of a processing device 760, an activity application 762 adapted to process digital content, and a user (not shown). Upon successful authentication, a Secure Authenticated Channel (SAC) is established between the processing device 760 and the workflow engine 770.

The user then selects 704 content to process from the protected content database 560, much like in FIG. 5. The processing device 760 then requests 706 processing of the content from the workflow engine 770. The workflow engine 770 retrieves 708 a content file 790 corresponding to the user's choice, decrypts the header 794 and extracts workflow information therein; step 710. The workflow engine 770 also retrieves 712 the workflow database entry corresponding to the workflow information of the header 794. In step 714, the workflow engine 770 decides whether or not the processing device 760 may process the digital content. This is preferably done by comparing the information about the requester (user, processing device 760, and activity application 762), workflow information in the header 794 of the content file 790 (workflow identifier, preceding node), information from the entry in the workflow database (next node in the process graph), and possibly schedules, present time and so on.

If the processing device 760 is authorised to process the digital content 792, then the workflow engine 770 generates 716 a workflow agent plug-in adapted to enforce the workflow. The workflow agent plug-in comprises the decryption key for decrypting the digital content 792 and the encryption key for re-encrypting the digital content 792 after processing. Note that, as previously mentioned, processing does not necessarily imply modification of the digital content 792.

The workflow engine 770 sends 718 the workflow agent plug-in to the processing device 760 that, preferably after integrity verification, runs 720 the workflow agent plug-in and gets 722 the content file 790 from the protected content database 560. The processing device 760 then decrypts the digital content 792 using the workflow agent plug-in, processes the digital content, and re-encrypts it using the workflow agent plug-in; step 724.

The digital content file 790 is then sent 726 to the protected content database 560 for storage and the processing device 760 notifies 728 the workflow engine 770 that the digital content 792 has been re-encrypted and the content file stored.

Second Preferred Embodiment

In a second preferred embodiment, the process graph for a content is comprised in a centrally located workflow database and the decryption keys are delivered from it to the processing engines, but the decision whether an agent is allowed to process the content is taken by the agent itself.

Figure 6:
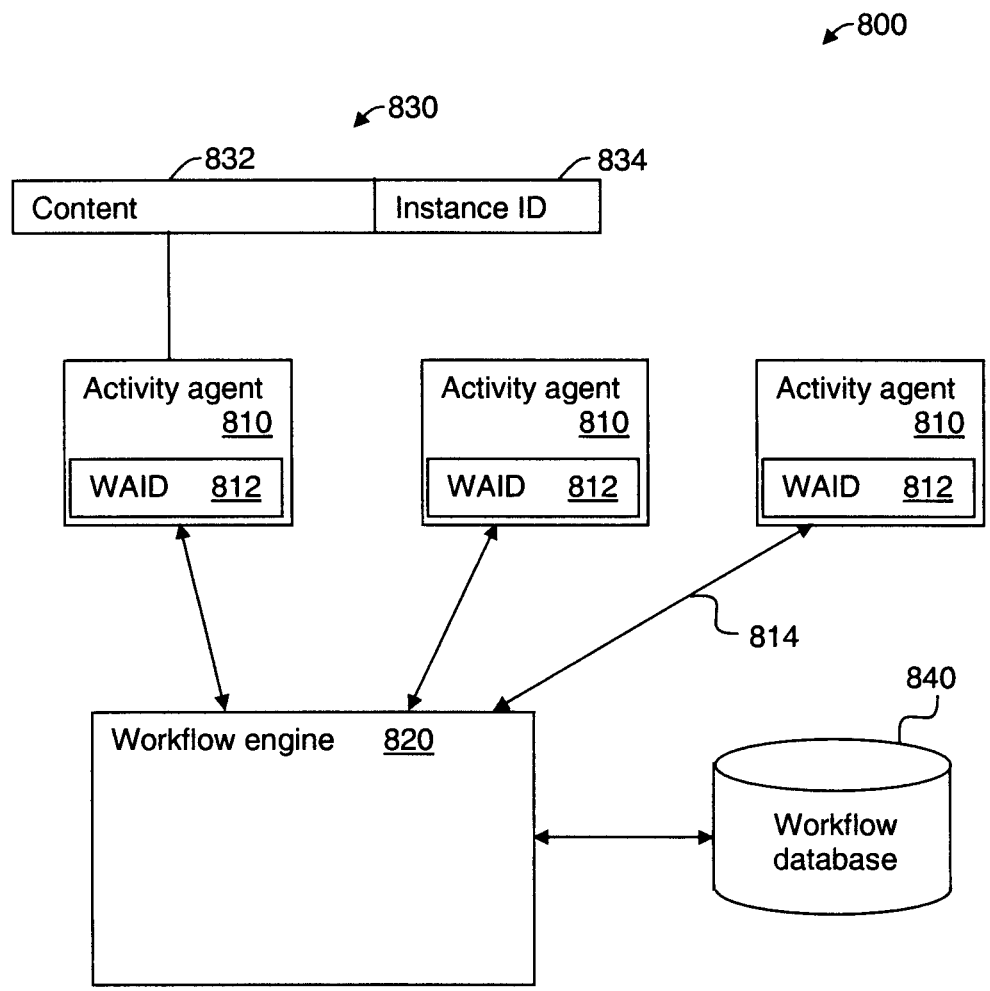
FIG. 6 illustrates a system for digital content processing according to a second preferred embodiment of the invention.
Figure 7:
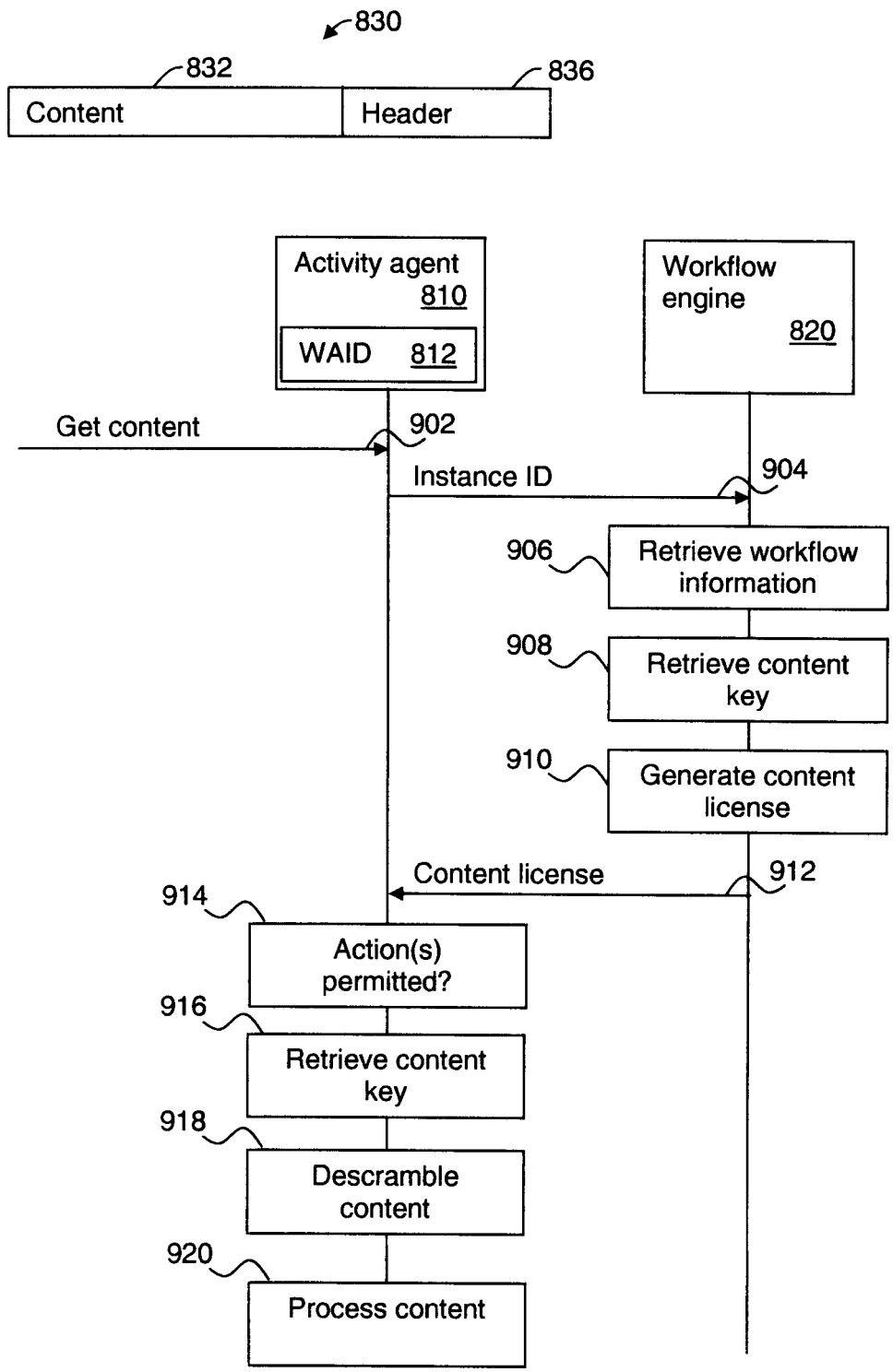
FIG. 7 illustrates an exemplary flow chart for a method for digital content processing according to the second preferred embodiment of the invention.

FIG. 6 illustrates a system for digital content processing of content according to a second preferred embodiment of the present invention and FIG. 7 illustrates an exemplary flow chart for a method for digital content processing according to the second preferred embodiment of the invention A system 800 for enforcing a workflow for a digital content comprises at least one workflow activity agent 810 adapted to modify digital content 832, a workflow engine 820, and a workflow database 840. Each workflow activity agent 810 stores a unique workflow agent identifier (WAID) 812, preferably in a secured location.

As in the first embodiment, the digital content 832 is encrypted when it is not being processed by a workflow activity agent 810. Digital content 832 that is not being processed is stored in a content file 830, preferably together with an identifier 834 that provides information about the WAID 812 of the workflow activity agent 810 that most recently processed the digital content 832, and a header (not shown) with a content identifier of the digital content.

The workflow engine 820 may prepare raw content much like the ingest engine of the first embodiment. Doing so, it encrypts the raw digital content with a scrambling key to generate protected digital content and decides which workflow to use for the digital content. An entry for the digital content is stored in the workflow database 840, the entry comprising an identifier for the digital content, the scrambling key used to protect the digital content, the workflow to use for the content, and a position indicator. It will however be appreciated that it is also possible to modify the process graph each time it has been processed in order to remove nodes that have already been passed. The workflow database 840 (and/or the workflow engine) may also store information about the correspondence between a WAID 812 and the one or more nodes that the workflow activity agent 810 may act as.

When a user wishes to process a digital content, it gets the corresponding content file 830, step 902, and extracts the content identifier 834 (i.e. instance ID) from the content file 830 and sends 904 the content identifier to the workflow engine 820. In the second preferred embodiment, it is not necessary to protect this message. The workflow engine 820 retrieves 906 workflow information corresponding to the content identifier from the workflow database 840, i.e. the actions that may be applied to the content by what activity agents. The workflow engine 820 also retrieves 908 the content key and generates 910 a protected license comprising at least the workflow information and the content key. The license is then sent 912 to the activity agent 810.

The license may be protected in any suitable prior art manner, such as for example using a domain key, a SAC session key, broadcast encryption, or public key encryption). However, as it is beyond the scope of the present invention, it will not be detailed further herein.

Upon reception of the license, the workflow agent 820 checks 914 the actions that are permitted on the content. If it is capable of performing a permitted action, then it retrieves 916 the content key from the license, descrambles 918 the content, and processes 920 the content.

When a workflow activity agent 810 has finished processing a digital content 832, it re-encrypts the digital content 832 and informs the workflow engine 820 that may then update the entry for the digital content 832 in the workflow database 840.

It will thus be appreciated that the present invention provides a solution with a plurality of embodiments for digital process management that can ensure that the digital content is processed according to a determined workflow.

Each feature disclosed in the description and (where appropriate) the claims and drawings may be provided independently or in any appropriate combination. Features described as being implemented in hardware may also be implemented in software, and vice versa. Connections may, where applicable, be implemented as wireless connections or wired, not necessarily direct or dedicated, connections.

Reference numerals appearing in the claims are by way of illustration only and shall have no limiting effect on the scope of the claims.

The invention claimed is:

1. A method of processing digital content according to a workflow, the method comprising, at a hardware processing device,
    (a) receiving, by the hardware processing device comprising a processing device identifier, a content file including the digital content, an identifier of a device that most recently processed the digital content and a header;
    (b) sending, by the hardware processing device, to a second device a content identifier for the digital content, the identifier of a device that most recently processed the digital content and the processing device identifier;
    (c) receiving, by the hardware processing device, a response signal from the second device authorising the hardware processing device to process the content, the authorization based on workflow auxiliary information for the digital content corresponding to the content identifier, wherein the workflow auxiliary information comprises at least one action that may be applied to the digital content by the hardware processing device and a determination that the processing device identifier corresponds to an identifier of a device following the device that most recently processed the digital content in the workflow; and
    if the hardware processing device is authorized to process the content:
        d1) receiving a decryption key for the encrypted digital content;
        d2) decrypting the encrypted digital content;
        d3) processing, by the hardware processing device, the decrypted digital content resulting in a modified digital content called processed digital content; and
        d4) re-encrypting the processed digital content.

2. A method of processing digital content according to a workflow, the method comprising, at a second hardware device:
    a) receiving a request, from a processing device by the second hardware device, to process the digital content,
    b) receiving, by the second hardware device, a content file including the digital content, an identifier of a device that most recently processed the digital content and a header;
    c) checking, by the second hardware device, workflow auxiliary information to decide if a processing device is authorized to process the content, the checking being performed by obtaining workflow auxiliary information for the digital content, wherein the workflow auxiliary information comprises at least one action that may be applied to the content by the processing device, by verifying if an identifier of said processing device corresponds to the identifier of a device following the device that most recently processed the digital content in the workflow; and
    if the second hardware device determines the processing device is authorized to process the content:
    d) sending by the second hardware device a processing plug-in to the processing device enabling the processing device to process the content; and
    e) updating, by the second hardware device, the workflow auxiliary information.

3. A method of processing digital content according to a workflow, the method comprising:
- a) receiving, by a hardware processing device comprising a processing device identifier, a content file including the digital content, an identifier of a device that most recently processed the digital content and a header;
- b) sending by the hardware processing device to a second device a content identifier for the digital content and the identifier for a device that most recently processed the digital content;
- c) receiving, by the hardware processing device from the second device, auxiliary information comprising at least one action that may be applied to the content by at least one processing device following the device that most recently processed the digital content in the workflow;
- d) checking, by the hardware processing device, if the processing device identifier corresponds to the identifier of a device following the device that most recently processed the digital content in the auxiliary information to decide if the hardware processing device is authorised to process the content; and
- if the hardware processing device is authorised to process the content:
- g1) receiving a decryption key for the encrypted digital content;
- g2) decrypting the encrypted digital content;
- g3) processing, by the hardware processing device, the decrypted digital content resulting in a modified digital content called processed digital content;
- g4) encrypting the processed digital content; and
- g5) updating, by the hardware processing device, the auxiliary information for the workflow.

4. A processing device for processing of digital content according to a workflow, the processing device, comprising:
- a receiver that receives a content file including the digital content, an identifier of a device that most recently processed the digital content and a header;
- a transmitter that sends a content identifier for the digital content, the identifier of a device that most recently processed the digital content and an identifier for the processing device, the receiver receiving a response signal from the second device authorizing the processing device to process the content, the authorization being based on workflow auxiliary information for the digital content corresponding to the content identifier wherein the workflow auxiliary information comprises at least one action that may be applied to the digital content by the processing device and a determination that the processing device identifier corresponds to the identifier of a device following the device that most recently processed the digital content in the workflow; and
- a processor, wherein, if the response signal indicates the processing device is authorized to process the content, the processor:
- d1) receiving a decryption key for the encrypted digital content;
- d2) decrypts the encrypted digital content;
- d3) processes the decrypted digital content resulting in a modified digital content called processed digital content; and
- d4) re-encrypts the processed digital content.

5. A device for controlling processing of digital content according to a workflow, the device comprising:
- a receiver that receives a request from a processing device to process the digital content, and receives a content file including the digital content, an identifier of a device that most recently processed the digital content and a header from a database;
- a processor that checks workflow information to determine if the requesting processing device is authorized to process the content, the checking being performed by obtaining workflow auxiliary information for the digital content, wherein the workflow auxiliary information comprises at least one action that may be applied to the content by the processing device, by obtaining an identifier for a device that most recently processed the digital content, and by verifying if the identifier of said processing device corresponds to an identifier of a device following the device that most recently processed the digital content in the workflow, the processor updating the workflow information upon determining the requesting processing device is authorized to process the content; and
- a transmitter that, upon determining by the processor that the requesting processing device is authorized to process the content, transmits a processing plug-in to the processing device enabling the processing device to process the content.

* * * * *